(12) United States Patent
Robertson, Jr. et al.

(10) Patent No.: US 11,675,111 B2
(45) Date of Patent: Jun. 13, 2023

(54) VEHICLE SENSOR ASSEMBLY

(71) Applicant: Ford Global Technologies, LLC, Dearborn, MI (US)

(72) Inventors: Michael Robertson, Jr., Garden City, MI (US); Mark Edward Nichols, Saline, MI (US); Cindy Anne Peters, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 16/931,559

(22) Filed: Jul. 17, 2020

(65) Prior Publication Data
US 2022/0018994 A1 Jan. 20, 2022

(51) Int. Cl.
| | |
|---|---|
| *B32B 27/06* | (2006.01) |
| *G02B 1/14* | (2015.01) |
| *G02B 7/02* | (2021.01) |
| *B32B 7/12* | (2006.01) |
| *C03C 17/34* | (2006.01) |
| *B32B 37/00* | (2006.01) |
| *B32B 7/05* | (2019.01) |
| *G02B 1/18* | (2015.01) |

(52) U.S. Cl.
CPC .................. *G02B 1/14* (2015.01); *B32B 7/05* (2019.01); *B32B 7/12* (2013.01); *B32B 27/06* (2013.01); *B32B 37/003* (2013.01); *C03C 17/34* (2013.01); *G02B 1/18* (2015.01); *G02B 7/02* (2013.01); *B32B 2255/10* (2013.01); *B32B 2255/26* (2013.01); *B32B 2307/412* (2013.01); *B32B 2307/728* (2013.01); *B32B 2551/00* (2013.01); *C03C 2217/75* (2013.01)

(58) Field of Classification Search
CPC .... G02B 1/14; G02B 1/18; G02B 7/02; C03C 2217/75; B32B 7/05; B32B 7/12; B32B 27/12; B32B 27/06; B32B 2255/26; B32B 2307/728; B32B 2551/00
USPC ........................................ 359/507
See application file for complete search history.

(56) References Cited

U.S. PATENT DOCUMENTS

| | | | |
|---|---|---|---|
| 7,309,527 B2 | 12/2007 | O'Shaughnessy et al. | |
| 8,057,615 B2 | 11/2011 | Grussaute-Nghiem et al. | |
| 8,809,785 B2 | 8/2014 | Arslan et al. | |
| 2006/0275859 A1* | 12/2006 | Kjaer .................... | C12Q 1/002 435/25 |
| 2007/0182900 A1* | 8/2007 | Hsiao ................ | G02F 1/133555 349/114 |
| 2008/0090083 A1* | 4/2008 | Park .................. | G02F 1/133516 427/407.1 |
| 2015/0314322 A1 | 11/2015 | Chang et al. | |

FOREIGN PATENT DOCUMENTS

CN 102529286 A 7/2012

* cited by examiner

*Primary Examiner* — Ruiyun Zhang
(74) *Attorney, Agent, or Firm* — Frank A. MacKenzie; Bejin Bieneman PLC

(57) ABSTRACT

An assembly includes a sensor lens, a polymer film adhered to the sensor lens, a hydrophilic coating applied to the sensor lens, and a fluid layer between the sensor lens and the polymer film, wherein the fluid layer is disposed on the hydrophilic coating.

19 Claims, 7 Drawing Sheets

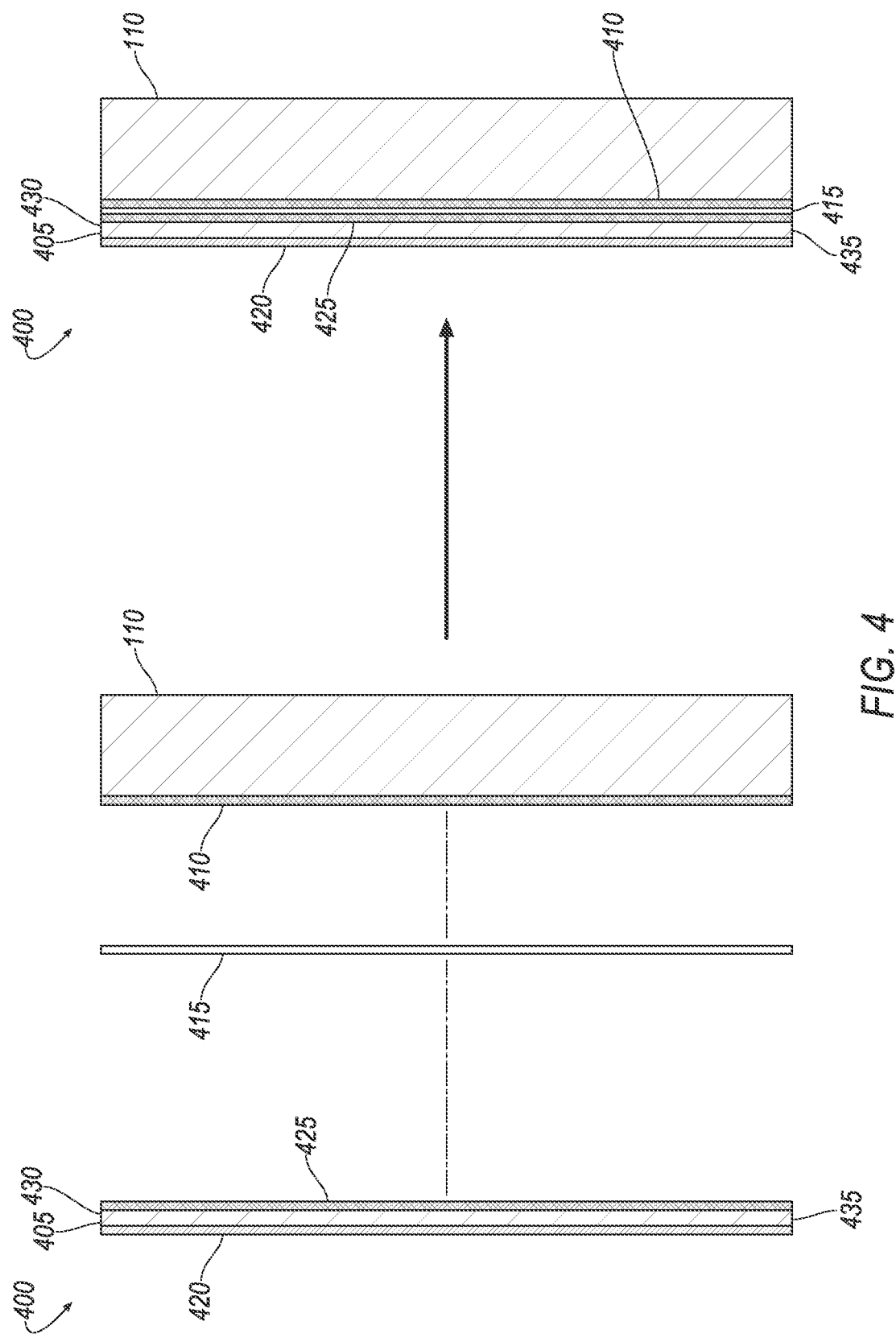

VEHICLE SENSOR ASSEMBLY

BACKGROUND

Vehicles, such as passenger cars, typically include sensors to collect data about a surrounding environment. The sensors can be placed on or in various parts of the vehicle, e.g., a vehicle roof, a vehicle hood, a rear vehicle door, etc. The sensors, e.g., sensor lenses, may become dirty during operation of the vehicle. During vehicle operation, sensor data and/or environmental conditions around a vehicle can be changing, and such changes can affect sensor operation.

BRIEF DESCRIPTION OF THE DRAWINGS

FIG. 4 is a cross-sectional view of another assembly for the example sensor of FIG. 1.

DETAILED DESCRIPTION

Figure 1:
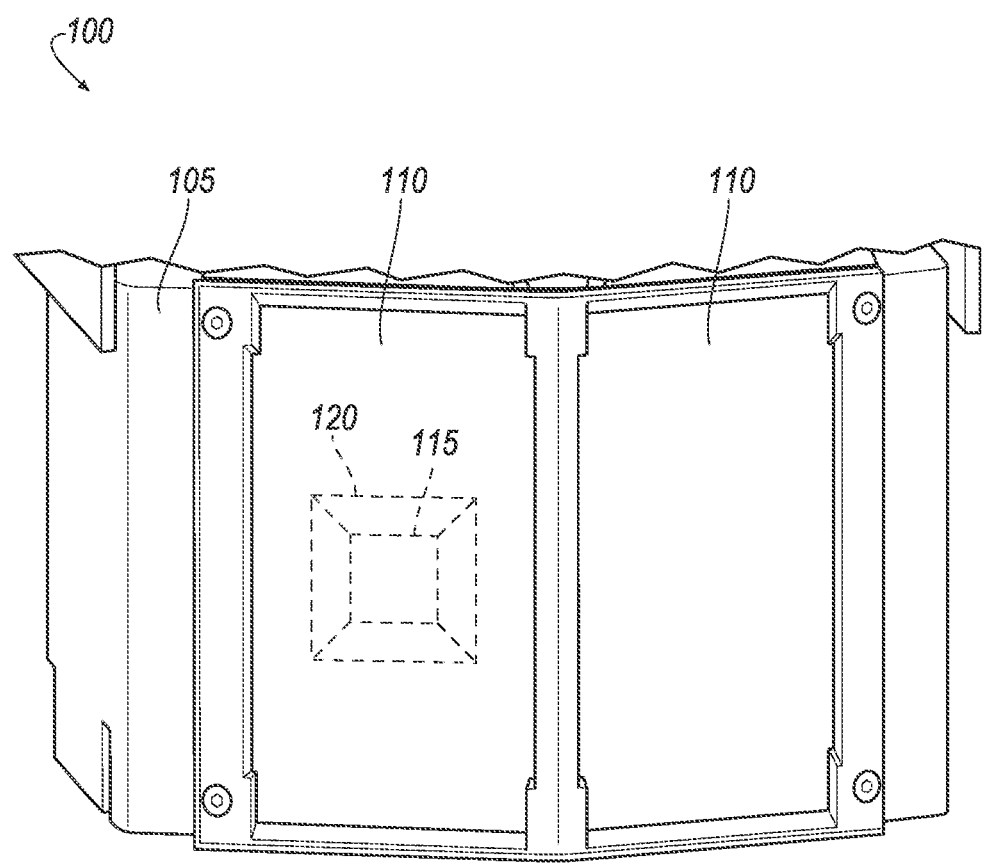
FIG. 1 is a perspective view of an example sensor.

An assembly includes a sensor lens, a polymer film adhered to the sensor lens, a hydrophilic coating applied to the sensor lens, and a fluid layer between the sensor lens and the polymer film. The fluid layer is disposed on the hydrophilic coating.

The assembly can further include a second hydrophilic coating applied to the polymer film, wherein the fluid layer contacts both the hydrophilic coating and the second hydrophilic coating.

The hydrophilic coating and the second hydrophilic coating can adhere the polymer film to the sensor lens.

The assembly can further include an adhesive disposed around an edge of the polymer film, and the adhesive can define an interior portion of the polymer film. The fluid layer can be disposed between the hydrophilic coating and the interior portion of the polymer film.

The sensor lens can define a viewing portion of a sensor, and the interior portion of the polymer film can cover the viewing portion.

The fluid layer can be substantially free of bubbles.

The hydrophilic coating can include one of polyether, polyvinyl alcohol, polyvinyl pyrrolidone, polyurethane, polyvinyl acetate, or titanium dioxide.

The polymer film can include a first side and a second side, the fluid layer can contact the first side, and a hydrophobic coating can be applied to the second side.

The fluid layer can define a contact angle with the hydrophilic coating, the contact angle being below a threshold.

The hydrophilic coating can allow transmission of at least one of visible electromagnetic waves, infrared electromagnetic waves, or microwave electromagnetic waves therethrough.

The sensor lens can be arranged to receive data transmitted by visible electromagnetic waves, infrared electromagnetic waves, or microwave electromagnetic waves through the hydrophilic coating.

The polymer film can have a first edge and a second edge, and the fluid layer can extend from the first edge to the second edge.

The sensor lens can be substantially planar.

The sensor lens can be substantially cylindrical.

The fluid layer can cover an emission range of a sensor emitter.

An assembly includes a sensor lens, a polymer film adhered to the sensor lens, and means for attracting a fluid to the sensor lens to form a fluid layer between the sensor lens and the polymer film.

The assembly can further include means for adhering an edge of the polymer film to define an interior portion of the polymer film. The fluid layer can be disposed between the means for attracting and the interior portion of the polymer film.

The polymer film can include a first side and a second side, the fluid layer can contact the first side, and the assembly can further include means for repelling the fluid from the second side.

A transparent polymer film can protect a sensor lens from occlusion by debris. Pockets of water and air trapped between the polymer film and the sensor lens may distort, by refraction, light passing through the sensor lens to a receiver of a sensor. A fluid layer between the polymer film and the sensor lens mitigates the distortion by removing air-water boundaries (e.g., from air bubbles suspended in water) that can refract light differently and cause distortions in the received light. Applying a hydrophilic coating to the sensor lens attracts water, reducing bubbles that may form between the sensor lens and the polymer film. That is, the hydrophilic coating can chemically attract water to form the fluid layer. The hydrophilic coating can reduce a number of bubbles between the sensor lens and the polymer film, improving data collection by the sensor by reducing potential distortions of the data.

FIG. 1 is a perspective view of an example sensor 100. The sensor 100 includes a housing 105, a sensor lens 110, and a sensor emitter 115. The housing 105 supports the sensor lens 110. The example sensor 110 of FIG. 1 includes two sensor lenses 110, and the sensor 100 can include a different number of lenses 110, e.g., one, three, etc. The sensor emitter 115 emits electromagnetic (EM) waves through the sensor lens to collect data. That is, the sensor lens 110 allows transmission of at least one of, e.g., visible waves, infrared waves, microwave EM waves, lasers, etc. For example, the sensor 100 can be a radar, and the sensor emitter 115 can transmit electromagnetic waves between, e.g., 30 hertz and 300 gigahertz, through the sensor lens 110. In another example, the sensor 100 can be, e.g., a lidar, an infrared sensor, a microwave sensor, etc. The sensor lens 110 can cover an emission range 120 of the sensor emitter 115. That is, the sensor emitter 115 can transmit the EM waves in a specified area at specified distances out from the sensor emitter 115 based on the size and shape of the sensor emitter 115. The specified area at one of the specified distances is the "emission range" 120. The sensor lens 110 can be arranged to cover the entire emission range 120, allowing emission of substantially all EM waves from the sensor emitter 115 through the sensor lens 110. In the example of FIG. 1, the sensor lens 110 is substantially planar, i.e., the sensor lens 110 is flat with substantially no curvature.

Figure 2:
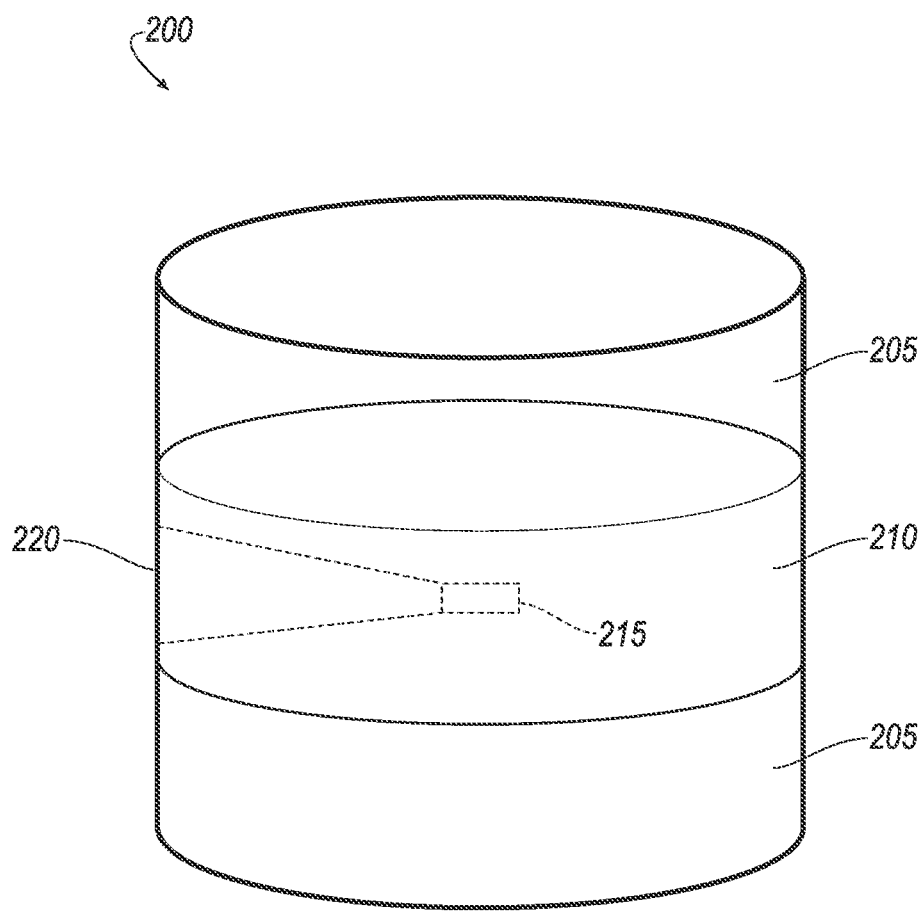
FIG. 2 is a perspective view of another example sensor.

FIG. 2 is a perspective view of another example sensor 200. The sensor 200 can be, e.g., a radar, a lidar, an infrared sensor, a microwave sensor, etc. The sensor 200 includes a housing 205, a sensor lens 210, and a sensor emitter 215. The sensor lens 210 can be substantially cylindrical. That is, an outer surface of the sensor lens 210 can define a circle, and the sensor lens 210 can be substantially flat in an axial direction. The sensor lens 210 thus can be curved. Alternatively, the sensor lens 210 can have a different shape, e.g., spherical, elliptical, parabolic, etc. The sensor emitter 215 defines an emission range 220. As described above, the sensor lens 210 can cover the emission range 220 of the sensor emitter 215, allowing substantially all EM waves from the sensor emitter 215 through the sensor lens 110.

Figure 3A:
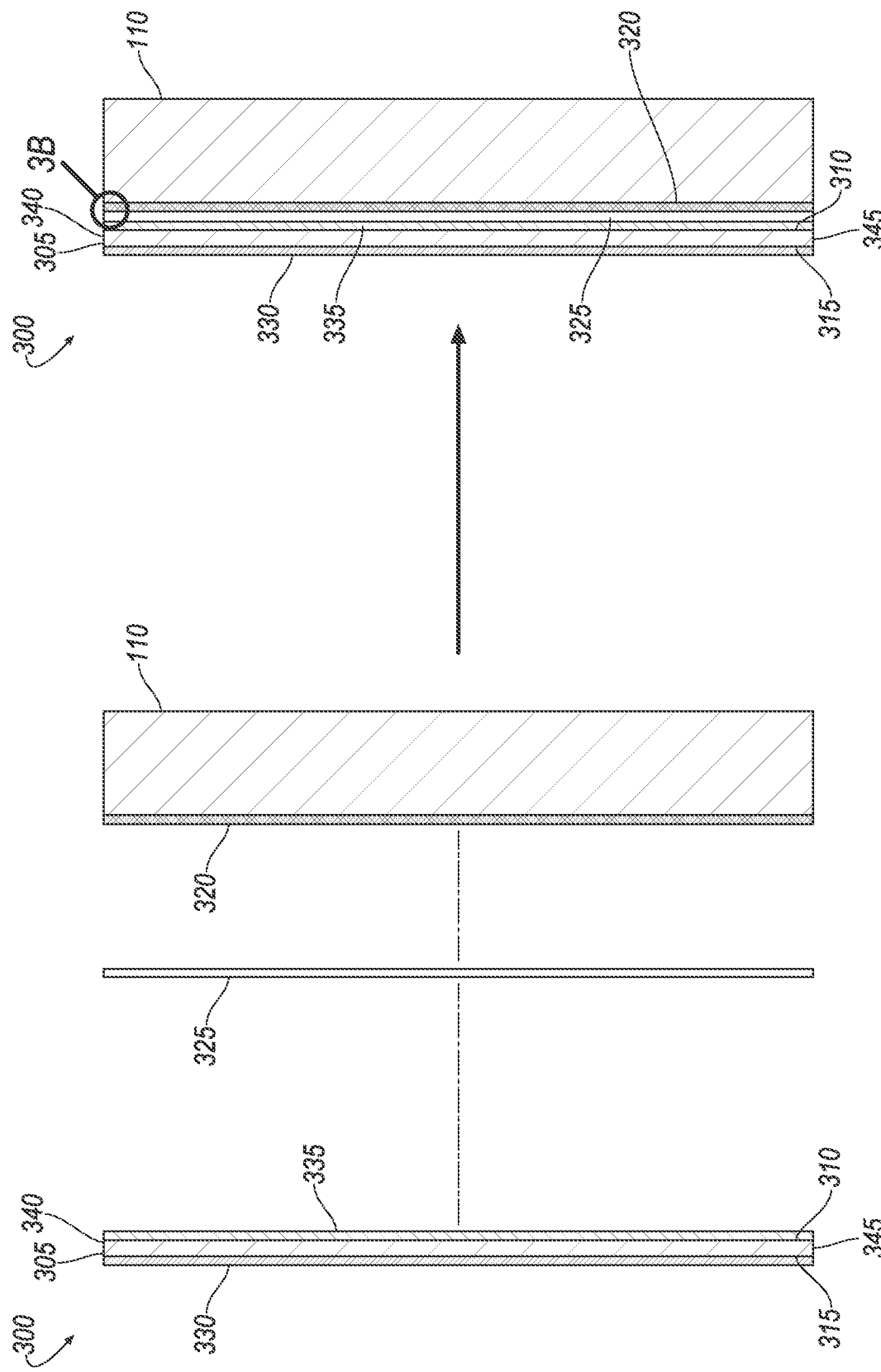
FIG. 3A is a cross-sectional view of an assembly for the example sensor of FIG. 1.

FIG. 3A is a cross sectional view of an assembly 300 for a sensor 100, 200. The assembly 300 includes the planar sensor lens 110 shown in FIG. 3. Alternatively, not shown in the Figures, the assembly 300 can include the cylindrical sensor lens 210. The assembly 300 allows emission of EM waves from the sensor emitter 115, 215 without occlusion from, e.g., debris, dust, precipitation, etc. That is, material "occludes" the sensor lens 110, 210 by blocking or interfering with the EM waves emitted by the sensor emitter 115, 215. Reducing occlusion of the sensor emitter 115, 215 can improve data collection by the sensor 100, 200 by increasing an amount of EM waves that are emitted by the sensor emitter 115, 215 and received by a receiver of the sensor 100, 200.

The assembly 300 includes a polymer film 305. The polymer film 305 can be adhered to the sensor lens 110. The polymer film 305 protects the sensor lens 110 from debris and/or precipitation that occlude the sensor lens 110. The polymer film 305 is transparent, i.e., the polymer film 305 allows transmission of EM waves from the sensor emitter 115 and/or to a receiver of the sensor 100. The polymer film 305 can be, e.g., polyethylene, polyurethane, polyethylene terephthalate (PET), thermoplastic polyurethane (TPU), polycarbonate, acrylic, fluoropolymer, etc. The polymer film 305 includes a first side 310 and a second side 315. The first side 310 faces the sensor lens 110. The second side 315 opposes the first side 310 and faces away from the sensor lens 110. The polymer film 305 includes a first edge 340 and a second edge 345.

The assembly 300 includes a hydrophilic coating 320. A "hydrophilic coating" is a chemical that attracts water by chemical forces, e.g., van der Waals forces, that is applied to the sensor lens 110. The hydrophilic coating 320 is disposed on the sensor lens 110. The hydrophilic coating 320 attracts water to form a fluid layer 325 on the sensor lens 110. The hydrophilic coating 320 can be one of, e.g., polyether, polyvinyl alcohol, polyvinyl pyrrolidone, polyurethane, polyvinyl acetate, titanium dioxide, polyethylene glycol, etc, as well as copolymers and/or blends of these chemicals. The hydrophilic coating 320 is transparent, i.e., the hydrophilic coating 320 allows transmission of at least one of visible EM waves, infrared EM waves, or microwave EM waves therethrough. The sensor lens 110 is thus arranged to receive data transmitted by visible EM waves, infrared EM waves, or microwave EM waves through the hydrophilic coating 320.

The fluid layer 325 is disposed between the sensor lens 110 and the polymer film 305. The hydrophilic coating 320 applied to the sensor lens 110 attracts water, forming the fluid layer 325. The fluid layer 325 can cover the emission range 120 of the sensor emitter 115. The polymer film 305 may be applied to the sensor lens 110, trapping the fluid layer 325 between the polymer film 305 and the sensor lens 110. That is, the polymer film 305 can repel debris and/or precipitation from the fluid layer 325 and the sensor lens 110, reducing occlusion of the sensor lens 110. The fluid layer 325 can be applied to the sensor lens 110 by spraying water onto the hydrophilic coating 320, and the water may "wet" onto the hydrophilic coating 320. That is, the water can adhere to the hydrophilic coating 320 by chemical forces (e.g., van der Waals forces), and the adhering of water to the hydrophilic coating 320 by the chemical forces is "wetting" the hydrophilic coating 30. Thus, the water wetted to the hydrophilic coating 320 is the fluid layer 325. The fluid layer 325 can contact the first side 310 of the polymer film 305 when the polymer film 305 is applied to the sensor lens 110. The fluid layer 325 can extend from the first edge 340 of the polymer film 305 to the second edge 345 of the polymer film 305.

By adhering to the hydrophilic coating 320, the fluid layer 325 may be substantially free of bubbles. That is, water may be applied to the hydrophilic coating 320, and the hydrophilic coating 320 attracts the water to form the fluid layer 325. Because the hydrophilic coating 320 covers the sensor lens 110 with the fluid layer 325, substantially no air is trapped between the polymer film 305 and the sensor lens 110 to form bubbles. Thus, the hydrophilic coating 320 reduces or prevents occlusion of the sensor lens 110 caused by bubbles.

Figure 3B:
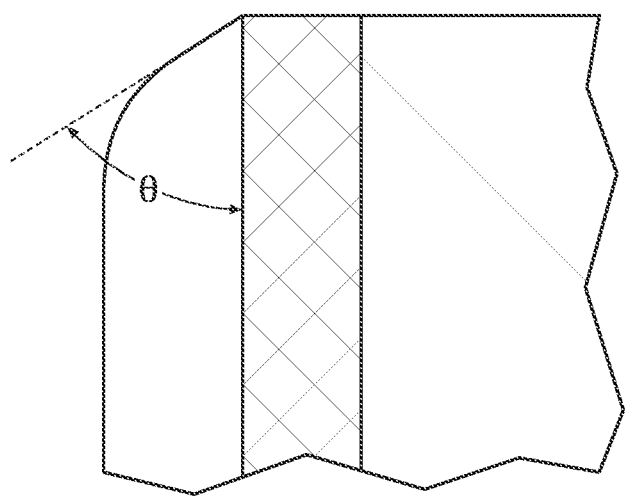
FIG. 3B is a magnified view of a fluid layer of the assembly of FIG. 3A.

The fluid layer 325 can define a contact angle $\theta$ with the hydrophilic coating 320, as shown in FIG. 3B. A "contact angle" $\theta$ is an angle defined between the surface of the fluid layer 325 at an edge of the fluid layer 325 and the hydrophilic coating 320. That is, surface tension of the fluid layer 325 forms a curved edge described by conventional fluid mechanics equations, e.g., the Young-Dupré contact angle equation, and the contact angle $\theta$ is a boundary condition of the Young-Dupré equation at the edge of the fluid layer 325 contacting the hydrophilic coating 320. The hydrophilic coating 320 can be selected based on the contact angle $\theta$ of the fluid layer 325. That is, the hydrophilic coating 320 can be selected such that the contact angle $\theta$ is below a predetermined threshold. The threshold can be determined based on empirical testing of applying hydrophilic coatings 320 with different contact angles $\theta$ to test lenses and identifying a number of bubbles on the test lenses after applying water to the hydrophilic coatings 320. The threshold can be the contact angle $\theta$ of the hydrophilic coating 320 of one of the test lenses with no visible bubbles. The threshold can be, e.g., 90 degrees.

The assembly 300 can include a hydrophobic coating 330. A "hydrophobic coating" is a chemical that repels water by chemical forces that is applied to the polymer film. The hydrophobic coating 330 can be applied to the polymer film 305 to reduce precipitation adhering to the polymer film 305, thus reducing or preventing occlusion of the sensor lens 110. The hydrophobic coating 330 can be, e.g. fluoropolymer, polysiloxane, acrylic polymer, polystyrenezinc oxide polystyrene, polyurethane (including copolymers and/or blends of these chemicals), manganese oxide, precipitated calcium carbonate, perfluorobutanesulfonic acid, etc. The hydrophobic coating 330 can be applied to the second side 315 of the polymer film 305. Thus, the hydrophobic coating 330 can be exposed to precipitation that could occlude the sensor lens 110, causing the precipitation to flow away from the sensor lens 110 and reducing or preventing occlusion of the sensor lens 110.

The assembly 300 can include an adhesive 335. The adhesive 335 adheres the polymer film 305 to the sensor lens 110. The adhesive 335 can be, e.g., an epoxy, polyurethane, acrylic, etc. The adhesive 335 can be transparent, i.e., allowing transmission of EM waves therethrough. The fluid layer 325 can extend to the adhesive 335. That is, the adhesive 335 can contact the sensor lens 110 with substantially no water therebetween, increasing adhesion of the polymer film 305 to the sensor lens 110.

FIG. 4 is a cross sectional view of an example assembly 400. The assembly 400 can include a polymer film 405, a hydrophilic coating 410, a fluid layer 415, and a hydrophobic coating 420, as described above. The polymer film 405 includes a first edge 430 and a second edge 435. The fluid layer 415 can extend from the first edge 430 of the polymer film 405 to the second edge 435 of the polymer film 405.

The assembly 400 can include a second hydrophilic coating 425. The second hydrophilic coating 425 can be disposed on the polymer film 405. The hydrophilic coating 410 on the sensor lens 110 and the second hydrophilic coating 425 on the polymer film 405 can trap the fluid layer 415 therebetween. That is, the fluid layer 415 can contact both the hydrophilic coating 410 and the second hydrophilic coating 425. The second hydrophilic coating 425 can be a same hydrophilic coating as the hydrophilic coating 410, e.g., polyether, polyvinyl alcohol, polyvinyl pyrrolidone, polyurethane, polyvinyl acetate, poly(ethylene glycol), copolymers of the previously mentioned polymers, titanium dioxide, etc.

The hydrophilic coating 410 and the second hydrophilic coating 425 can adhere the polymer film 405 to the sensor lens 110. The fluid layer 415 is cohesive, i.e., the water molecules in the fluid layer 415 can, through hydrogen bonds, attract each other and resist gravitational forces. As described above, the fluid layer 415 can be wetted to the hydrophilic coating 410 and the second hydrophilic coating 425, e.g., with van der Waals forces. Because the fluid layer 415 is adhered to the hydrophilic coatings 410, 425 and cohesively resists gravity, the fluid layer 415 can adhere the polymer film 405 to the sensor lens 110. Thus, the polymer film 405 can adhere to the sensor lens 110 without an adhesive.

Figure 5:
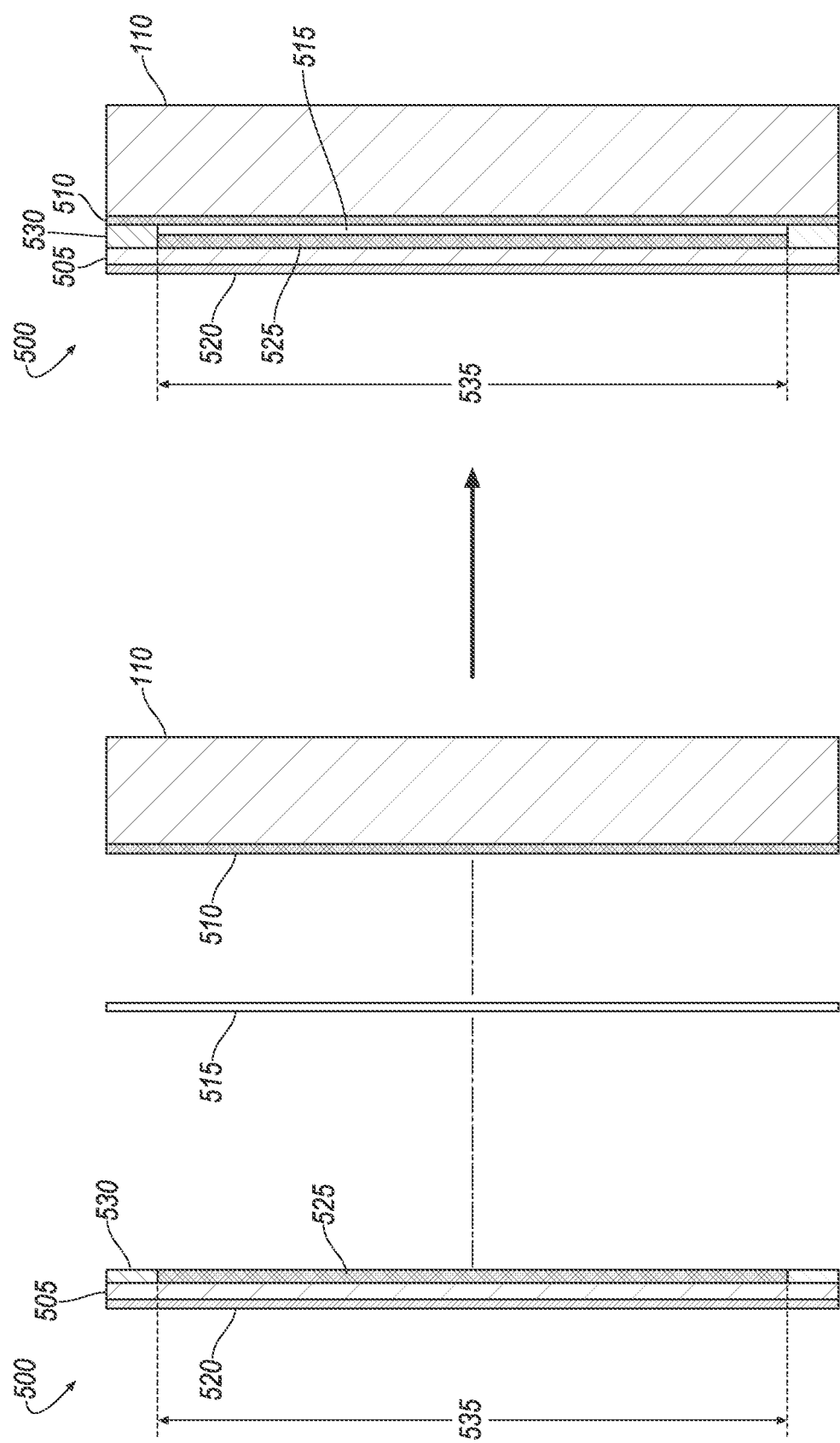
FIG. 5 is a cross-sectional view of another assembly for the example sensor of FIG. 1.

FIG. 5 is a cross sectional view of an example assembly 500. The assembly 500 includes a polymer film 505, a hydrophilic coating 510, a fluid layer 515, and a hydrophobic coating 520. The assembly 500 includes a second hydrophilic coating 525, like the assembly 400. The assembly 500 includes an adhesive 530, like the assembly 300. The adhesive 530 defines an interior portion 535 of the polymer film 505. That is, the adhesive 530 can be disposed around an edge of the polymer film 505, and the portion of the polymer film 505 without adhesive 530 is the interior portion 535. The fluid layer 515 can be disposed between the hydrophilic coating and the interior portion of the polymer film.

Figure 6:
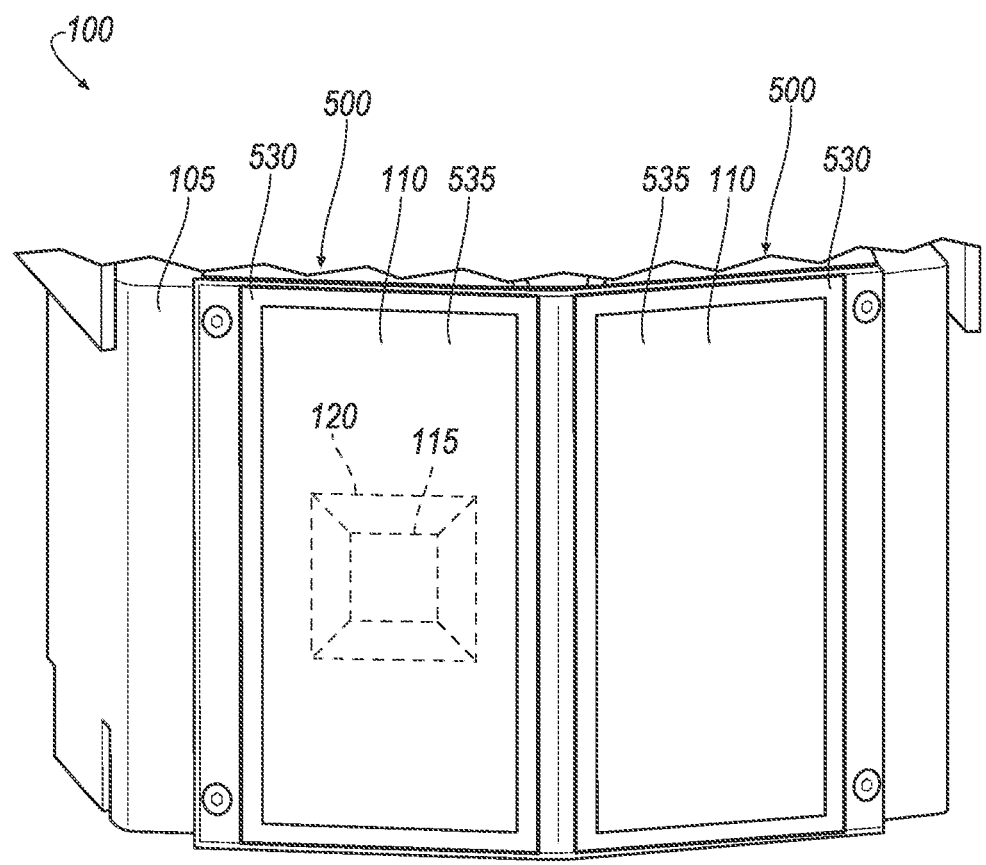
FIG. 6 is a perspective view of the assembly of FIG. 5 applied to an example sensor.

The sensor lens 110 can define a viewing portion of the sensor 100, i.e., a portion of the sensor 100 through which data can be transmitted and received. The interior portion 535 of the polymer film 505 can cover the viewing portion, placing the fluid layer 515 over the viewing portion. The fluid layer 515 can cover the emission range 120 of the sensor emitter 115, as shown in FIG. 6. Because the fluid layer 515 is transparent water, the sensor 100 can transmit and receive data through the fluid layer 515.

FIG. 6 is a perspective view of the sensor 100 with the assembly 500. The interior portion 535 of the polymer film 505 can cover the emission range 120 of the sensor emitter 115. The fluid layer 515, being disposed between the interior portion 535 of the polymer film 505 and the sensor lens 110, allows transmission of EM waves therethrough. That is, the sensor emitter 115 can emit EM waves through the fluid layer 515. Reflected EM waves can travel through the fluid layer 515 to a receiver (not shown) of the sensor 100. Thus, the polymer film 505 and the fluid layer 515 protect the sensor lens 110 from occluding debris, improving data collecting by the sensor.

To install an assembly 300, 400, 500 to a sensor 100, 200, a manufacturer applies a hydrophilic coating 320, 410, 510 to a sensor lens 110, 210, applies a fluid layer 325, 415, 515 to the hydrophilic coating 320, 410, 510, and adheres a polymer film 305, 405, 505 to the sensor lens 110, 210. The fluid layer 325, 415, 515 is disposed between the hydrophilic coating 320, 410, 510 and the polymer film 305, 405, 505. The manufacturer can apply a force to the polymer film 305, 405, 505 to remove bubbles from the fluid layer 325, 415, 515, e.g., with a blade. The manufacturer can apply a second hydrophilic coating 425, 525 to the polymer film 405, 505 and wet the fluid layer 415, 515 between the hydrophilic coating 410, 510 and the second hydrophilic coating 425, 525. The manufacturer can adhere the polymer film 305, 505 to the sensor lens 110, 210 with an adhesive 335, 530. The adhesive 530 can define an interior portion 535 of the polymer film 505, and the fluid layer 515 can be disposed between the hydrophilic coating 510 and the interior portion 535 of the polymer film 505.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a sensor lens;
a polymer film adhered to the sensor lens;
a hydrophilic coating applied to the sensor lens;
a second hydrophilic coating applied to the polymer film; and
a fluid layer between the sensor lens and the polymer film;
wherein the fluid layer is disposed on the hydrophilic coating,
wherein the fluid layer contacts both the hydrophilic coating and the second hydrophilic coating, and
wherein the sensor lens is transmissive to visible electromagnetic waves, infrared electromagnetic waves, or microwave electromagnetic waves.

2. The assembly of claim 1, wherein the hydrophilic coating and the second hydrophilic coating adhere the polymer film to the sensor lens.

3. The assembly of claim 1, further comprising an adhesive disposed around an edge of the polymer film, the adhesive defining an interior portion of the polymer film, wherein the fluid layer is disposed between the hydrophilic coating and the interior portion of the polymer film.

4. The assembly of claim 3, wherein the sensor lens defines a viewing portion of a sensor, and the interior portion of the polymer film covers the viewing portion.

5. The assembly of claim 1, wherein the fluid layer is substantially free of bubbles.

6. The assembly of claim 1, wherein the hydrophilic coating includes one of polyether, polyvinyl alcohol, polyvinyl pyrrolidone, polyurethane, polyvinyl acetate, or titanium dioxide.

7. The assembly of claim 1, wherein the polymer film includes a first side and a second side, the fluid layer contacts the first side and a hydrophobic coating is applied to the second side.

8. The assembly of claim 1, wherein an edge of the fluid layer defines a contact angle with the hydrophilic coating, the contact angle being below a threshold.

9. The assembly of claim 1, wherein the hydrophilic coating allows transmission of at least one of visible electromagnetic waves, infrared electromagnetic waves, or microwave electromagnetic waves therethrough.

10. The assembly of claim 9, wherein the sensor lens is arranged to receive data transmitted by visible electromagnetic waves, infrared electromagnetic waves, or microwave electromagnetic waves through the hydrophilic coating.

11. The assembly of claim 1, wherein the polymer film has a first edge and a second edge, and the fluid layer extends from the first edge to the second edge.

12. The assembly of claim 1, wherein the sensor lens is substantially planar.

13. An assembly, comprising:
a sensor lens;
a polymer film adhered to the sensor lens;
a hydrophilic coating applied to the sensor lens; and
a fluid layer between the sensor lens and the polymer film;
wherein the fluid layer is disposed on the hydrophilic coating, and
wherein the sensor lens is transmissive to visible electromagnetic waves, infrared electromagnetic waves, or microwave electromagnetic waves,
wherein the sensor lens is substantially cylindrical.

14. The assembly of claim 1, wherein the fluid layer covers an emission range of a sensor emitter.

15. An assembly, comprising:
a sensor lens;
a polymer film adhered to the sensor lens; and
hydrophilic means on the sensor lens and to the polymer film for attracting a fluid to the sensor lens and to the polymer film to form a fluid layer between the sensor lens and the polymer film,
wherein the sensor lens is transmissive to visible electromagnetic waves, infrared electromagnetic waves, or microwave electromagnetic waves.

16. The assembly of claim 15, further comprising means for adhering an edge of the polymer film to define an interior portion of the polymer film, wherein the fluid layer is disposed between the means for attracting and the interior portion of the polymer film.

17. The assembly of claim 15, wherein the polymer film includes a first side and a second side, the fluid layer contacts the first side, and the assembly further includes means for repelling the fluid from the second side.

18. The assembly of claim 15, wherein the polymer film has a first edge and a second edge, and the fluid layer extends from the first edge to the second edge.

19. The assembly of claim 15, wherein the fluid layer covers an emission range of a sensor emitter.

* * * * *